(12) United States Patent
Miyazaki

(10) Patent No.: US 8,957,366 B2
(45) Date of Patent: Feb. 17, 2015

(54) LIGHT SOURCE UNIT INCLUDING A LIGHT EMITTING PLATE ON WHICH A DIFFUSIVE TRANSMISSION AREA AND A LUMINESCENT LIGHT EMITTING AREA ARE FORMED, AND PROJECTOR

(71) Applicant: Casio Computer Co., Ltd., Tokyo (JP)

(72) Inventor: Takeshi Miyazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 174 days.

(21) Appl. No.: 13/644,206

(22) Filed: Oct. 3, 2012

(65) Prior Publication Data

US 2013/0083297 A1      Apr. 4, 2013

(30) Foreign Application Priority Data

Oct. 3, 2011   (JP) .................................. 2011-219325

(51) Int. Cl.
  *G01J 3/50*   (2006.01)
  *G03B 21/20*  (2006.01)
  *G03B 33/08*  (2006.01)

(52) U.S. Cl.
  CPC .............. *G03B 21/204* (2013.01); *G03B 33/08* (2013.01)
  USPC ........................................ 250/226; 250/208.1

(58) Field of Classification Search
  USPC ........... 250/208.1, 226, 239, 216; 353/31, 84, 353/85; 362/19, 23, 84
  See application file for complete search history.

(56) References Cited

U.S. PATENT DOCUMENTS 8,403,492 B2   3/2013 Shibasaki
8,405,014 B2 * 3/2013 Shibasaki ..................... 250/205

FOREIGN PATENT DOCUMENTS

| CN | 101937162 A | 1/2011 |
| JP | 2004-341105 A | 12/2004 |
| JP | 2011-013317 A | 1/2011 |

OTHER PUBLICATIONS

Chinese Office Action dated Jul. 22, 2014 in counterpart Chinese Application No. 201210369353.X.

* cited by examiner

*Primary Examiner* — Que T Le
(74) *Attorney, Agent, or Firm* — Holtz, Holtz, Goodman & Chick PC

(57) ABSTRACT

There is provided a light source unit comprising a first and second light sources, a luminescent light emitting device having a light emitting plate, a light source control device controlling the illumination of the light sources and driving of the light emitting plate, and a light guiding optical system guiding light from the light sources and luminescent light from the light emitting plate so that optical axes coincide to be directed in the same direction, wherein the light emitting plate includes a first area with a luminescent material layer on a reflection layer, a second area transmitting light from the light sources while diffusing it and a third area with a luminescent material layer on a dichroic layer, and wherein the light emitting plate includes a drive motor positioning repeatedly sequentially the first, second and third areas in an optical axis position of light from the light sources.

10 Claims, 8 Drawing Sheets

| EMITTING LIGHT | | GREEN | BLUE | RED | YELLOW |
|---|---|---|---|---|---|
| THE SECOND LIGHT SOURCE (RED) | ON | | | | |
| | OFF | | | | |
| THE FIRST LIGHT SOURCE (BLUE) | ON | | | | |
| | OFF | | | | |
| ROTATIONAL POSITION OF THE WHEEL | | THE FIRST AREA (LUMINESCENT MATERIAL · REFLECTION LAYER) | THE SECOND AREA (DIFFUSING PORTION) | | THE THIRD AREA (LUMINESCENT MATERIAL DICHROIC LAYER) |

| EMITTING LIGHT | | GREEN | BLUE | RED | WHITE | |
|---|---|---|---|---|---|---|
| THE SECOND LIGHT SOURCE (RED) | ON OFF | | | | | |
| THE FIRST LIGHT SOURCE (BLUE) | ON OFF | | | | | |
| ROTATIONAL POSITION OF THE WHEEL | | THE FIRST AREA (LUMINESCENT MATERIAL · REFLECTION LAYER) | THE SECOND AREA (DIFFUSING PORTION) | | THE THIRD AREA (LUMINESCENT MATERIAL DICHROIC LAYER) | |

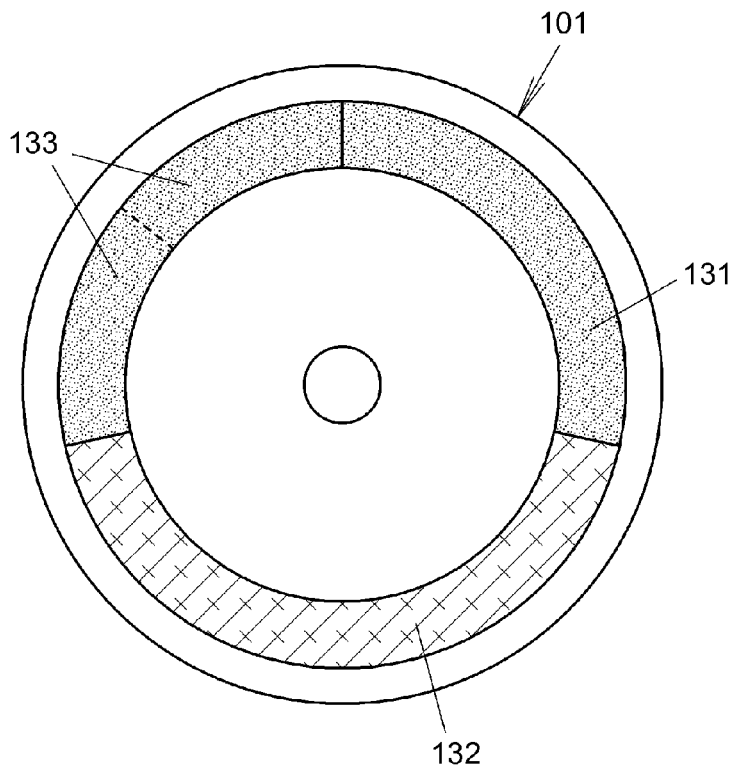

LIGHT SOURCE UNIT INCLUDING A LIGHT EMITTING PLATE ON WHICH A DIFFUSIVE TRANSMISSION AREA AND A LUMINESCENT LIGHT EMITTING AREA ARE FORMED, AND PROJECTOR

CROSS-REFERENCE TO RELATED APPLICATION

This application is based upon and claims the benefit of priority under 35 USC 119 of Japanese Patent Application No. 2011-219325 filed on Oct. 3, 2011, the entire contents of which, including the description, claims, drawings and abstract, are incorporated herein by reference.

BACKGROUND OF THE INVENTION

1. Field of the Invention

The present invention relates to a light source unit and a projector that includes the light source unit.

2. Description of the Related Art

In these days, data projectors are used on many occasions as image projection units which project images including images of a screen and video images of a personal computer, as well as images based on image data which are stored in a memory card on to a screen. In these projectors, light emitted from a light source is collected on to a micromirror display element called a digital micromirror device (DMD) or a liquid crystal panel for projection of color images on to a screen.

Conventionally, the mainstream of these projectors has been those which utilize a high-intensity discharge lamp as a light source. In recent years, however, there have been made many developments and proposals on light source units which use light emitting diodes (LEDs), laser diodes (LD) or organic electroluminescent semiconductors.

For example, KOKAI (Japanese Unexamined Patent Publication) No. 2004-341105 (Patent Literature 1) proposes a light source unit that includes a light emitting wheel on which a luminescent material is laid in a circumferential direction and an ultraviolet light emitting diode. The light source unit proposed in Patent Literature 1 is configured so that ultraviolet light as an excitation light is shone on to the light emitting wheel from a rear side thereof to emit luminescent light from a front side of the light emitting wheel for use as light source light.

Then, in a light source unit for use in a projector, it is required that the light source unit can generate light having a wavelength band of red light, light having a wavelength band of green light and light having a wavelength band of blue light as the three primary colors of light. In a configuration that employs a light emitting wheel like the one described in KOKAI No. 2004-341105, it is possible to generate the three primary colors of light by laying a red luminescent material layer, a green luminescent material layer and a blue luminescent material layer in an end-to-end fashion in a circumferential direction.

In addition, KOKAI (Japanese Unexamined Patent Publication) No. 2011-013317 proposes a projector which employs a light source unit including a blue laser emitting device. In this light source unit, a laser beam in the blue wavelength band is emitted as diffuse light from a diffusing portion to be shone on to a DMD through a light source side optical system and so on. Then, light in the green wavelength band is emitted from a green luminescent material by making use of the laser beam in the blue wavelength band as excitation light and is then shone on to the DMD through the light source side optical system and so on. Further, light in the red wavelength band is emitted from a red light emitting diode and is then shone on to the DMD through the light source side optical system and so on.

The light source unit according to KOKAI No. 2004-341105 has a problem that there is caused a big difference in luminance between the red, green and blue light.

Additionally, the light source unit according to KOKAI No. 2011-013317 has a problem that it is difficult to increase the luminance of red light, and hence, it is difficult that the projector forms a bright projection image.

BRIEF SUMMARY OF THE INVENTION

The invention has been made with a view to solving the aforesaid problems which is inherent in the related art, and an object of the invention is to provide a light source unit that can emit highly bright light and a projector that is small in size and which employs this light source unit so as to project a bright image.

With a view to attaining the object, according to a first aspect of the invention, there is provided a light source unit having a first light source and a second light source that emit light in different wavelength bands, a luminescent light emitting device having a light emitting plate on to which light emitted from the first light source and the second light source is shone, a light source control device that controls the turning on of the first light source and the second light source and the driving of the light emitting plate of the luminescent light emitting device, and a light guiding optical system that guides the light from the first light source and the second light source that passes through the light emitting plate and luminescent light generated and emitted from the light emitting plate so that optical axes thereof coincide with each other so as to be directed in the same direction, wherein the light emitting plate includes a first area where a luminescent material layer is provided on a reflection layer, a second area that transmits the light from the first light source and the second light source while diffusing it and a third area where a luminescent material layer is provided on a dichroic layer, and wherein the luminescent light emitting device includes a light emitting plate driving device that repeatedly and sequentially positions the first area, the second area and the third area in an optical axis position of the light emitted from the first light source and the second light source.

According to a second aspect of the invention, there is provided a projector including the light source unit described in the first aspect of the invention, a light source side optical system that guides light from the light source unit to a display element, a display element that forms an optical image by light shone on thereto, a projection side optical system that projects an optical image that is formed by the display element on to a screen, and a projector control system having a light source control unit for the light source unit and a display element control unit.

According to the invention, it is possible to provide the light source unit that is small in size and which can emit highly bright light by providing the two types of light source devices having the different output wavelength bands and the light emitting plate on which the luminescent light emitting area where the luminescent material layers are superposed on the reflection layer and the dichroic layer and the diffusing transmission area that transmits light in the diffusing fashion through the diffusing portion and also to provide the projector employing the light source unit aforesaid.

BRIEF DESCRIPTION OF THE DRAWINGS

Although the invention will be understood sufficiently from the following detailed description and accompanying drawings, the detailed description and the accompanying drawings will be presented mainly for easy understanding of the invention, and hence, there is no intention to limit the scope of the invention thereby.

In the accompanying drawings,

FIG. 8(a) is a diagram showing a light emitting wheel and FIG. 8(b) is a time chart showing light source turning on timings of a light source unit according to a further another embodiment of the invention.

DETAILED DESCRIPTION OF THE PREFERRED EMBODIMENT

Figure 1:
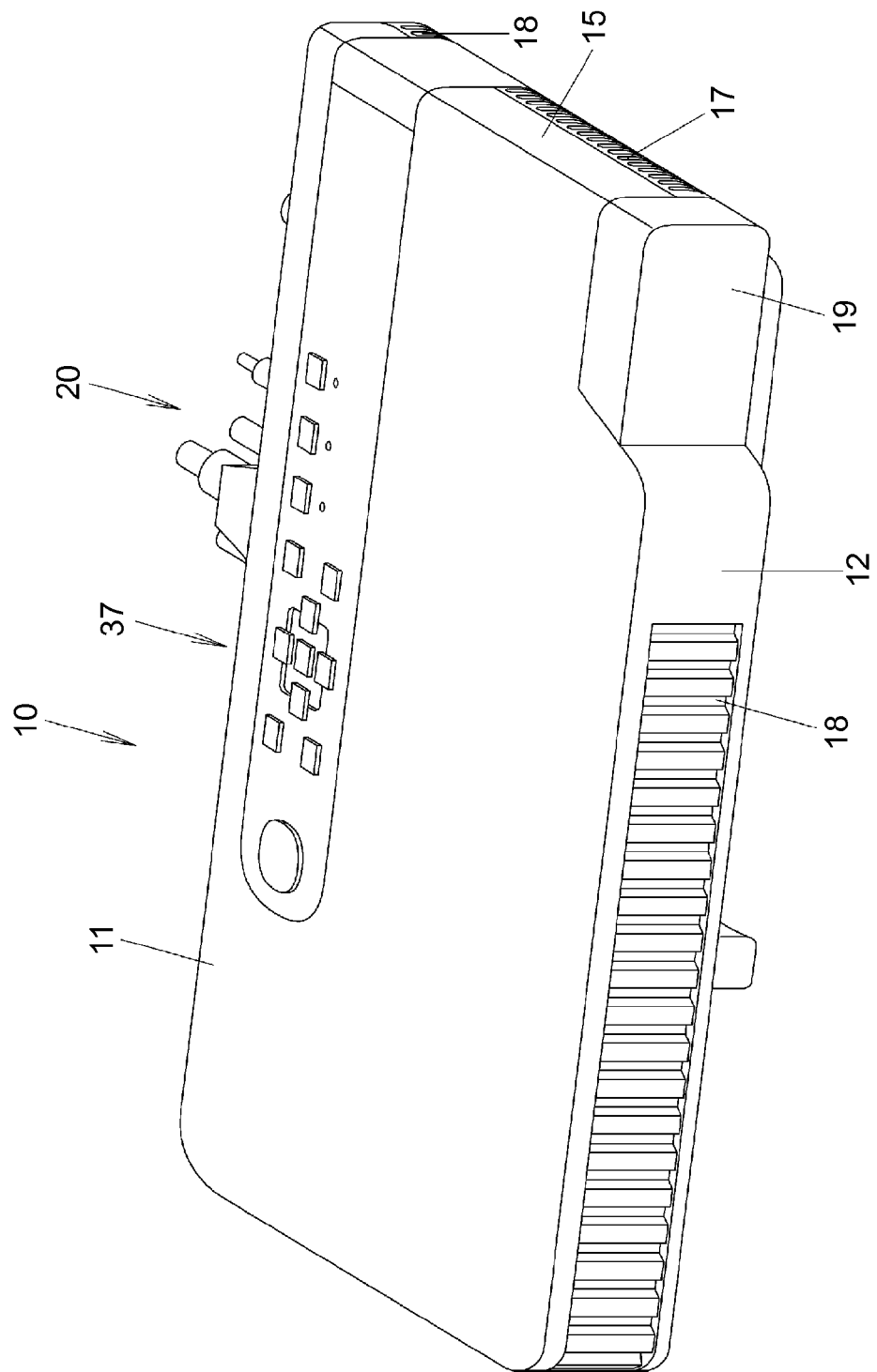
FIG. 1 is a perspective view showing an external appearance of a projector according to an embodiment of the invention.

Hereinafter, embodiments of the invention will be described by reference to the drawings. FIG. 1 is a perspective view showing an external appearance of a projector 10. It should be noted that when referred to with respect to the projector 10 in this embodiment, left and right denote, respectively, left and right directions with respect to a projecting direction of the projector 10, and front and rear denote, respectively, front and rear directions with respect to a direction towards a screen side of the projector 10 and a traveling direction of a pencil of light.

Additionally, as shown in FIG. 1, the projector 10 has a substantially rectangular parallelepiped shape and has a lens cover 19 which covers a projection opening which is laid to a side of a front side panel 12 which is referred to as a front side panel of a projector casing. Additionally, a plurality of outside air inlet ports 18 are formed in the front side panel 12. Further, although not shown, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display element, a control circuit or the like overheats.

Further, provided on a back side or a back side panel of the projector casing are an input/output connector unit where USB terminals, a video signal input D-SUB terminal into which an analog RGB video signal is inputted, an S terminal, an RCA terminal, an audio output terminal and the like are provided and various types of terminals 20 including a power supply adaptor plug. Additionally, a plurality of outside air inlet ports are formed in the back side panel. In addition, pluralities of inside air outlet ports 17 are formed in a right side panel which is a lateral side panel of the projector casing which is not shown and a left side panel 15 which is a lateral side panel shown in FIG. 1 respectively. Further, outside air inlet ports 18 are also formed in a position on the left side panel 15 which lies near a corner portion between the left side panel 15 and the back side panel.

Figure 2:
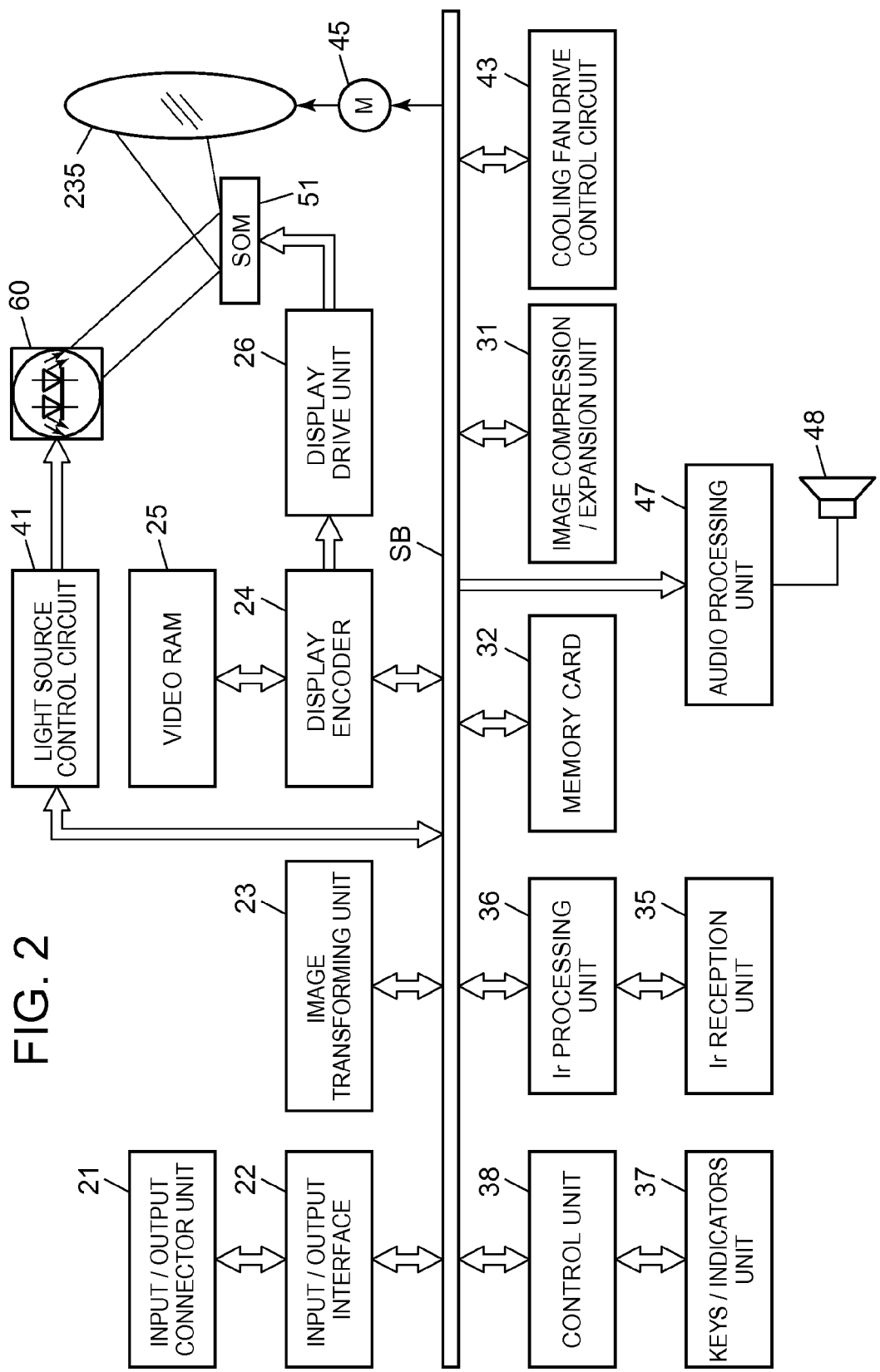
FIG. 2 is a functional block diagram of the projector according to the embodiment of the invention.

Next, a projector control system of the projector 10 will be described by use of a functional block diagram shown in FIG. 2. The projector control system includes a control unit 38, an input/output interface 22, an image transforming unit 23, a display encoder 24, a display drive unit 26 and the like. The control unit 38 governs the control of respective operations of circuitries within the projector 10 and is made up of a CPU, a ROM which stores in a fixed fashion operation programs of various types of settings and a RAM which is used as a working memory and so on.

Then, in this projector control system, image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display. Thereafter, the image signals so transformed are outputted to the display encoder 24.

In addition, the display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display element control unit and drives a display element 51 which is a spatial optical modulator (SOM) at an appropriate frame rate in response to the image signal outputted from the display encoder 24. Additionally, in this projector 10, a pencil of light that is emitted from a light source unit 60 is shone on to the display element 51 via a light source side optical system 170, which will be described later, to thereby form an optical image based on reflected light reflected by the display element 51. The image so formed is then projected on to a screen, not shown, for display thereon via a projection side optical system 220. In addition, a movable lens group 235 of this projection side optical system 220 is driven by a lens motor 45 for zooming or focusing.

Additionally, an image compression/expansion unit 31 executes a recording process in which a luminance signal and a color difference signal of an image signal are data compressed through processes such as ADCT and Huffman coding, and the compressed data is sequentially written on to a memory card 32 which is configured as a detachable recording medium. Further, when in a reproducing mode, the image compression/expansion unit 31 reads out the image data which is recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Then, operation signals generated at the keys/indicators unit 37 which is made up of the main keys and indicators which are provided on the upper side panel 11 of the projector casing are sent out directly to the control unit 38. Key operation signals from the remote controller are received by the Ir reception unit 35, and a code signal which is demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a loudspeaker 48 to radiate loudly sound or voice based on the audio data.

In addition, the control unit 38 controls a light source control circuit 41 which is configured as a light source control unit. This light source control circuit 41 controls individually the turning on and illumination of a first light source 70 which is a blue light source device and a second light source 120 which is a red light source device and the driving of a luminescent light emitting device 100 of the light source unit 60, which will be described later so as to emit a light having predetermined wavelength band, which is required when generating a image, from the light source unit 60.

Further, the control unit 38 causes a cooling fan drive control circuit 43 to detect temperatures through a plurality of temperature sensors which are provided in the light source unit 60 or the like so as to control the rotating speeds of cooling fans based on the results of the temperature detection. Additionally, the control unit 38 also causes the cooling fan drive control circuit 43 to make the cooling fans continue to rotate even after the power supply of a projector main body is switched off by use of a timer or the like. Alternatively, the control unit 38 causes the cooling fan drive control circuit 43 to make the power supply to the projector main body be switched off depending upon the results of the temperature detection by the temperature sensors.

Figure 3:
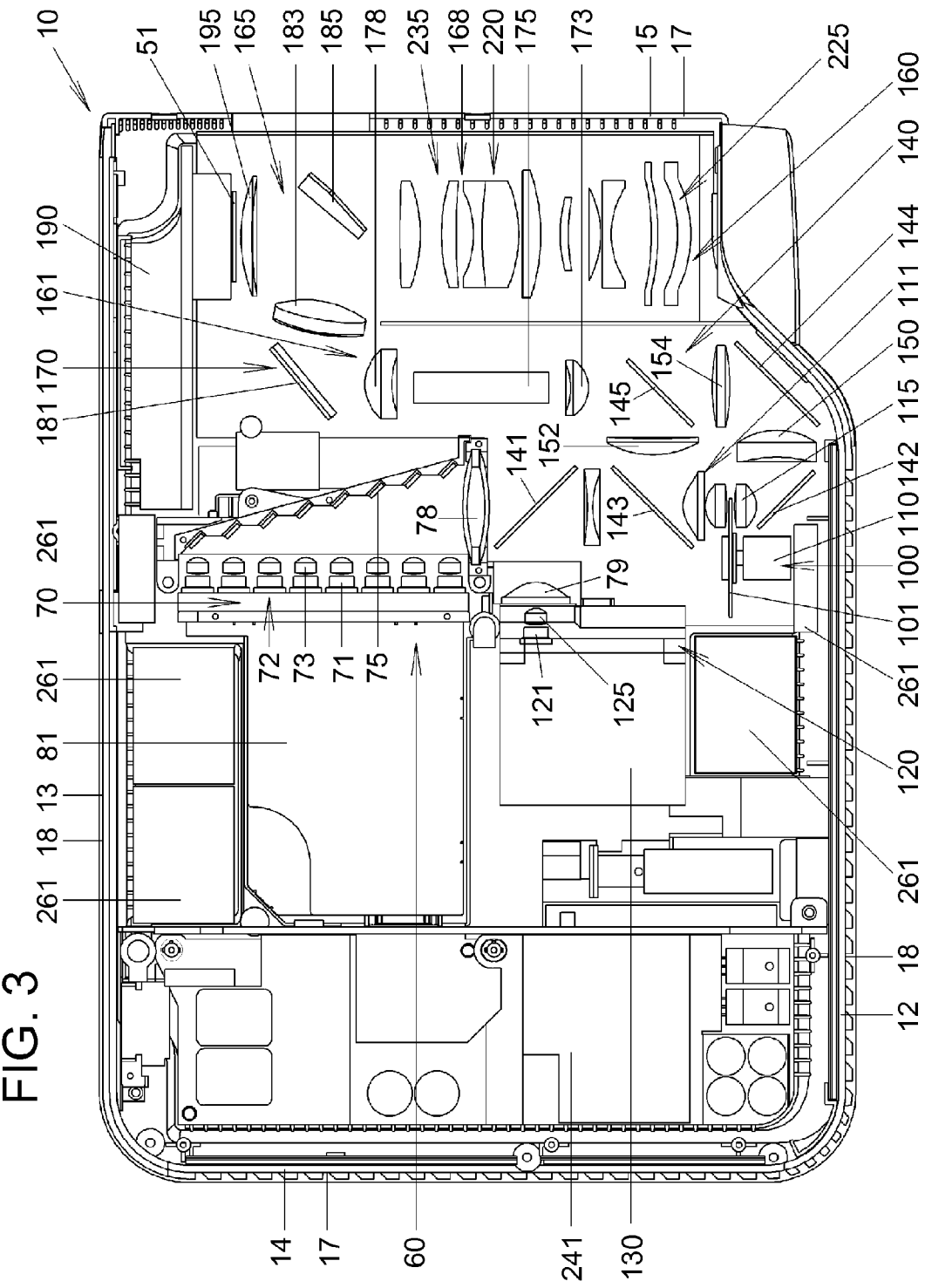
FIG. 3 is an exemplary plan view showing an internal construction of the projector according to the embodiment of the invention.
Figure 4:
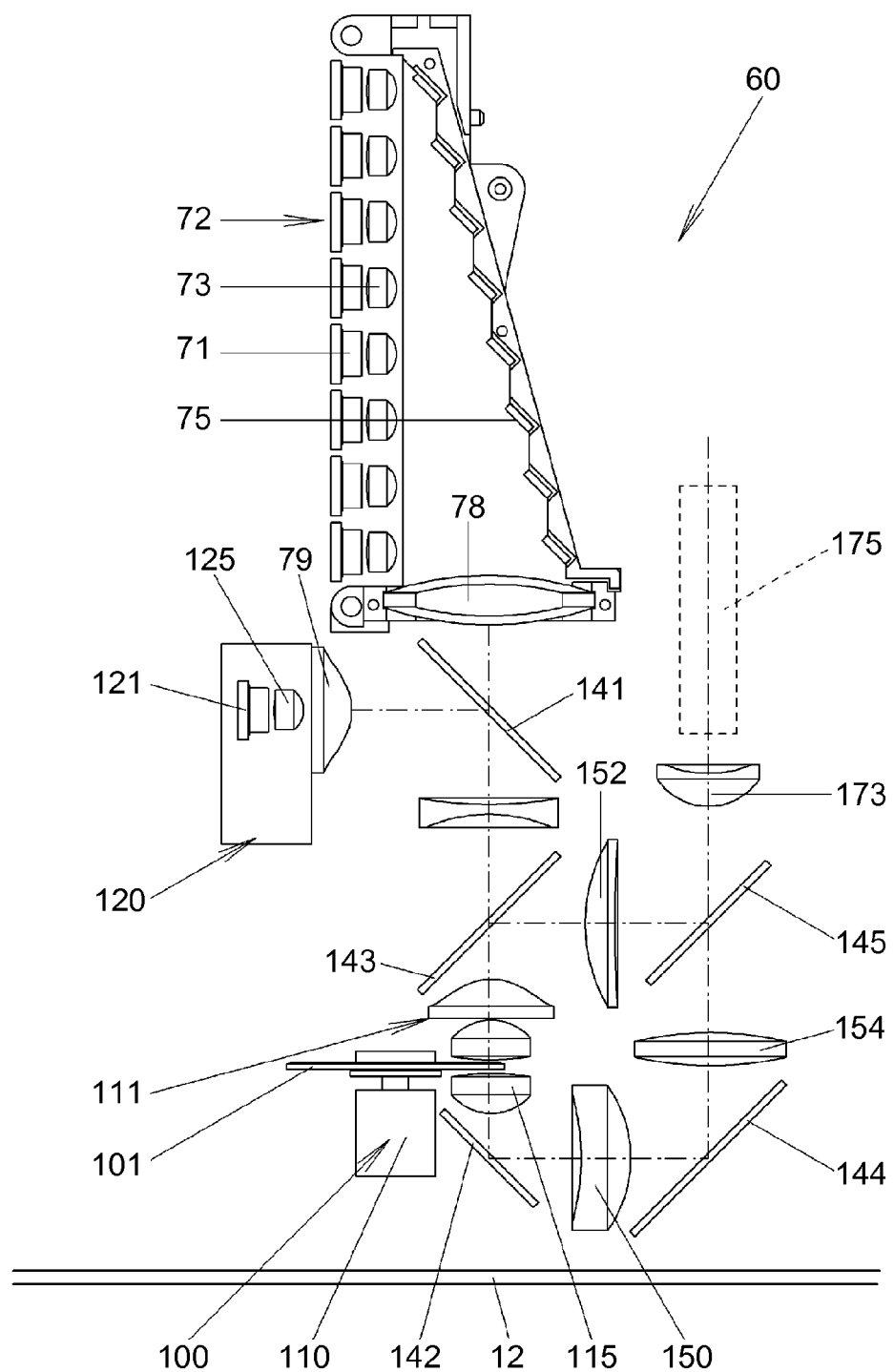
FIG. 4 is an exemplary plan view showing a light source unit according to the embodiment of the invention.

Next, an internal construction of the projector 10 will be described. FIG. 3 is an exemplary plan view showing an internal construction of the projector 10. FIG. 4 is an exemplary plan view showing the light source unit 60 as a light source unit for the projector 10. As shown in FIG. 3, the projector 10 includes a control circuit board 241 in the vicinity of the right side panel 14. This control circuit board 241 includes a power supply circuit block and a light source control block. Additionally, the projector 10 includes the light source unit 60 which is provided to a side of the control circuit board 241, that is, at a substantially central portion of the projector casing. Further, the projector 10 includes an optical system unit 160 between the light source unit 60 and the left side panel 15.

As shown in FIG. 3, the light source unit 60 as the light source unit includes the first light source 70, the second light source 120 and the luminescent light emitting device 100. The first light source 70 emits light in the wavelength band of blue light and is disposed at a substantially central portion of the projector casing in a left-to-right direction and near the back side panel 13. The second light source 120 is a red light source device which emits a pencil of light in the wavelength band of red light perpendicularly to an optical axis of a pencil of light emitted from the first light source 70. The luminescent light emitting device 100 is disposed near the front side panel 12 and includes a light emitting wheel 101 as a light emitting plate having a first area and a third area where luminescent material layers made up of a green luminescent light emitting luminescent material are provided and a second area which is made into a diffusive transmission area made up of a diffusing portion.

Additionally, the light source unit 60 includes a light guiding optical system 140. The light guiding optical system 140 shines light emitted from the first light source 70 and the second light source 120 on to the light emitting wheel 101 which is the light emitting plate via a dichroic mirror 141 for illumination light that transmits light of the first light source 70 which is light in the blue wavelength band and which reflects light of the second light source 120 which is light in the red wavelength band. The light guiding optical system 140 then turns the directions of optical axes of light that is emitted from the light emitting wheel 101 of the luminescent light emitting device 100 and light which is transmitted through the light emitting wheel 101 so that the optical axes of the light emitted from the light emitting wheel 101 and transmitted through the light emitting wheel 101 are all collected to the same optical axis. Thus, the light in the respective wavelength bands is guided to an entrance port of a light tunnel 175 which constitutes a predetermined plane.

The first light source 70 includes blue light sources 71 that are disposed so that optical axes thereof become parallel to the back side panel 13 and which are made up of blue laser emitting devices which are semiconductor elements, a reflection mirror group 75 which turns an optical axis of light emitted from the blue light sources 71 by 90 degrees in the direction of the front side panel 12, a collective lens 78 which collects light emitted from the blue light sources 71 and reflected by the reflection mirror group 75, and a heat sink 81 which is disposed between the blue light sources 71 and the right side panel 14.

In the blue light sources 71, in total, 24 blue laser emitting devices which are semiconductors are arranged into a matrix of three rows and eight columns. Then, collimator lenses 73 are disposed individually on optical axes of the blue laser emitting devices, and these collimator lenses 73 which are collecting lenses convert laser beams emitted from the blue laser emitting devices into parallel light. Additionally, in the reflection mirror group 75, reflection mirrors are arranged into steps like steps of a staircase. Pencils of light emitted from the blue light sources 71 are individually reflected by the reflection mirrors towards the collective lens 78 while narrowing the sectional areas of the pencils of light in one direction.

Cooling fans 261 are disposed between the heat sink 81 and the back side panel 13, and the blue light sources 71 are cooled by the cooling fans 261 and the heat sink 81. Further, a cooling fan 261 is also disposed between the reflecting mirror group 75 and the back side panel 13, and the reflecting mirror group 75 and the collective lens 78 are cooled by this cooling fan 261.

The red light source device which is the second light source 120 includes a red light source 121, a collimator lens 125 and a collective lens 79. This red light source 121 is made up of one or a plurality of red laser emitting devices which are semiconductors and is disposed so that a pencil of light is emitted therefrom in the direction of the front side panel 12 after being reflected by the illumination light dichroic mirror 141. The collimator lens 125 converts light emitted from the red light source 121 into parallel light. The collective lens 79 collects the light so emitted and transmitted through the collimator lens 125.

The light guiding optical system 140 includes the dichroic mirror 141 for illumination light. The dichroic mirror 141 is disposed in a position where the optical axis of light shone from the first light source 70 intersects the optical axis of light shone from the second light source 120. The dichroic mirror 141 transmits light in the blue wavelength band emitted from the first light source 70 and reflects light in the red wavelength band emitted from the second light source 120 in such a manner that the optical axis thereof coincides with the optical axis of the light from the first light source 70 which passes through the dichroic mirror 141. Thus, the dichroic mirror 141 shines the light from the first light source 70 and the light from the second light source 120 on to the light emitting wheel 101 of the luminescent light emitting device 100.

The luminescent light emitting device 100 transmits light from the first light source 70 and the second light source 120 while diffusing it to emit the light therefrom and constitutes a light source that emits green luminescent light. The luminescent light emitting device 100 includes a light emitting wheel 101 which is a light emitting plate and which is disposed so as to be parallel to the front side panel 12, that is, so as to be at right angle to the optical axis of the light that is emitted from the first light source 70 and the second light source 120, a wheel motor 110 which is a light emitting plate driving device that rotationally drives the light emitting wheel 101, a collective lens group 111 which collects a pencil of light that is emitted from the light emitting wheel 101 towards the first light source 70 and, and a collective lens 115 which collects a pencil of light which is emitted from the light emitting wheel 101 towards the front side panel 12.

Figures 5A, 5B:
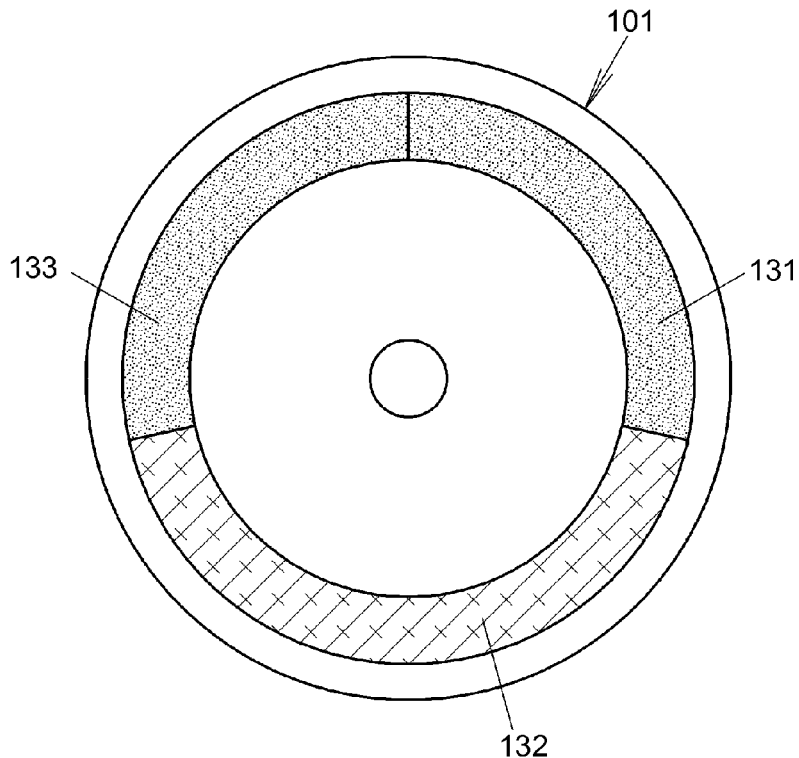
FIG. 5(a) is a diagram showing a light emitting wheel and FIG. 5(b) is a time chart showing light source turning on timings of the light source unit according to the embodiment of the invention.

The light emitting wheel 101 is formed of a circular disk-shaped transparent base. As shown in FIG. 5, the light emitting wheel 101 has three arc-shaped segment areas which are laid in a circumferential direction so as to be adjacent to each other end to end and is formed of a glass base or a transparent resin base. Additionally, on this transparent base, luminescent material layers that emits light in the wavelength band of green light are formed on a first area 131 which is a first segment area and a third area 133 which is a third segment area and a diffusing portion that transmits light from the first light source 70 and the second light source 120 while diffusing the light is formed on a second area 132 which is a second segment area.

The luminescent material layer is a layer which contains a green luminescent material. The green luminescent material absorbs light in the blue wavelength band that is emitted from the first light source 70 as excitation light and is then excited to emit light in the green wavelength band. The green luminescent material is made up of a green light emitting luminophor crystal and a binder. Additionally, in the first area 131, a reflection layer that reflects light is formed thereon by mirror finishing the transparent base through silver deposition, and the luminescent material layer which is formed of the green light emitting luminescent material is formed on the reflection layer.

In addition, in the third area 133, a dichroic layer is formed on a surface of the transparent base, and the luminescent material layer which is formed of the green light emitting luminescent material is formed on the dichroic layer. The dichroic layer reflects light in the blue wavelength band and light in the green wavelength band and transmits the other light including one in the red wavelength band.

Then, light emitted from the first light source 70 and shone on to the luminescent material layer on the light emitting wheel 101 excites the luminescent material on the light emitting wheel 101 to emit light in the green wavelength band in every direction so that the resulting luminescent light in the green wavelength band is emitted directly towards the first light source 70 or emitted eventually towards the first light source 70 after having been reflected on the reflection layer and the dichroic layer of the light emitting wheel 101. In addition, the excitation light that is shone on to the reflection layer and the dichroic layer without being absorbed by the green light emitting luminescent material in the luminescent material layer is reflected on the reflection layer and the dichroic layer to be incident on the luminescent material layer again so as to excite the luminescent material. Consequently, by adopting this reflection construction, the utilization efficiency of the excitation light which is the light in the blue wavelength band that is emitted from the first light source 70 can be enhanced.

Additionally, the second area 132 has the diffusing portion functioning as a diffusive transmission area. Specifically, the diffusing portion is formed by applying an optical treatment such as a roughening treatment employing a blast finishing to a portion of the transparent base where the diffusive transmission area is intended to be formed. Then, when light in the blue wavelength band and light in the green wavelength band is incident on the diffusing portion, the light can be diffused when it passes through the diffusing portion.

To form the diffusing portion, in addition to the optical treatment being applied to the surface of the transparent base, a belt-like solid substance which is an optical substance may be caused to stick to the portion of the transparent base where the diffusing portion is intended to be formed.

Then, in the light emitting wheel 101, a circular opening is formed in a central portion of the transparent base, and this circular opening corresponds to the shape of a cylindrical rotational shaft which constitutes a connecting portion with the driving motor 110. The rotational shaft is inserted securely in the circular opening, and a motor hub is bonded near the central portion of the transparent base, whereby the light emitting wheel 101 is strongly and rigidly connected to the rotational shaft of the drive motor 110.

Thus, the light emitting wheel 101 is rotated at a rotational speed of 120 revolutions per second, for example, in the circumferential direction together with the drive motor 110 by the drive motor 110 which functions as a drive unit that is controlled to be driven by the control unit 38 of the projector control system. Namely, the light emitting wheel 101 can be controlled to rotate so as to position sequentially and alternately the diffusive transmission area and the luminescent light emitting area of the light emitting wheel 101 in an optical axis position of light from the dichroic mirror 141 for illumination light.

Then, a cooling fan 261 is disposed between the drive motor 110 and the front side panel 12, and the light emitting wheel 101 is cooled by this cooling fan 261.

The red light source 121 is made up of a laser emitting diode that emits light in the red wavelength band. Further, the second light source 120 includes a heat sink 130 which lies on a side of the second light source 121 which faces the right side panel 14. Additionally, a cooling fan 261 is disposed between the heat sink 130 and the front side panel 12, and the red light source 121 is cooled by this cooling fan 261.

The light guiding optical system 140 includes a collective lens which collects pencils of light such as light in the red wavelength band and light in the blue wavelength band which pass through the light emitting wheel 101 and light in the green wavelength band which is emitted from the luminescent material, a plurality of total reflecting mirrors which turn the optical axes of pencils of light in the respective wavelength bands into the same optical axis and a plurality of dichroic mirrors.

Specifically, as shown in FIGS. 3 and 4, the light guiding optical system 140 includes a first dichroic mirror 143 between the dichroic mirror 141 for illumination light and the light emitting wheel 101, and this first dichroic mirror 143 transmits light in the blue wavelength band and light in the red wavelength band which are emitted from the first light source 70 and the second light source 120, respectively and reflects luminescent light in the green wavelength band emitted from the light emitting wheel 101.

The light guiding optical system 140 includes between the first dichroic mirror 143 and the light emitting wheel 101 the collective lens group 111 which collects the light emitted from the first light source 70 and the second light source 120 and transmitted through the first dichroic mirror 143 so as to be shone on to the diffusing portion of the light emitting wheel 101. The light guiding optical system 140 also includes the collective lens 115 which is provided closer to the front side panel 12 of the projector 10 than the light emitting wheel 101. This collective lens 115 collects light transmitted through the diffusing portion on the light emitting wheel 101 while being diffused. The light guiding optical system 140 includes further a first total reflecting mirror 142 which is provided closer to the front side panel 12 than the collective lens 115 and a second total reflecting mirror 144 which is provided to a side of the first total reflecting mirror 142. This second total reflecting mirror 144 turns the optical axes of the light emitted from the first light source 70 and the light emitted from the second light source 120 which are transmitted through the diffusing portion while being diffused and which are reflected on the first total reflecting mirror 142 so as to direct them in the direction of the light tunnel 175.

In addition, the light guiding optical system 140 also includes a collective lens 150 between the first total reflecting mirror 142 and the second total reflecting mirror 144. This collective lens 150 collects the light emitted from the first light source 70 and the light emitted from the second light source 120 which are transmitted through the diffusing portion while being diffused. The light guiding optical system 140 includes further a collective lens 154 between the second total reflecting mirror 144 and a second dichroic mirror 145, which will be described later. This collective lens 154 collects the light emitted from the first light source 70 and the light emitted from the second light source 120 that are transmitted through the diffusing portion while being diffused and which are reflected on the second total reflecting mirror 144.

Additionally, the light guiding optical system 140 includes the second dichroic mirror 145. This second dichroic mirror reflects the light in the green wavelength band emitted from the luminescent material layer that is reflected on the first dichroic mirror 143 and which passes through the collective lens 152 and transmits the light emitted from the first light source 70 and the light emitted from the second light source 120 that are transmitted through the light emitting wheel 101 while being diffused and which are reflected on the second total reflecting mirror 144.

This second dichroic mirror 145 is positioned between the collective lens 154 which is positioned on a side of the second total reflecting mirror 144 which faces the back side panel 13 and the collective lens 173 which is positioned near the entrance port of the light tunnel 175 and is disposed in a position where the optical axis of the light in the green wavelength band which is reflected on the first dichroic mirror 143 intersects the optical axis of the light which is reflected on the second total reflecting mirror 144.

Then, the optical system unit 160 is formed substantially into a U-shape by three blocks: an illumination side block 161, an image generation block 165 and a projection side block 168. The illumination side block 161 is positioned to a left-hand side of the first light source 70, the image generation block 165 is positioned near a position where the back side panel 13 intersects the left side panel 15, and the projection side block 168 is positioned between the light guiding optical system 140 and the left side panel 15.

This illumination side block 161 includes a part of a light source side optical system 170 which guides light source light emitted from the light source unit 60 to the display element 51 that the image generation block 165 possesses. Raised as the part of the light source side optical system 170 that the illumination side block 161 possesses are the light tunnel 175 that converts the pencil of light emitted from the light source unit 60 into a pencil of light in which the intensity is uniformly distributed, a collective lens 178 that collects light emitted from the light tunnel 175 and an optical axis turning mirror 181 that turns the optical axis of a pencil of light emitted from the light tunnel 175 in the direction of the image generation block 165.

The image generation block 165 possesses, as a part of the light source side optical system 170, a collective lens 183 that collects the light source light, that is reflected on the optical axis turning mirror 181, onto the display element 51 and a shining mirror 185 that shines the pencil of light, that passes through the collective lens 183, on to the display element 51 at a predetermined angle. Further, the image generation block 165 includes a DMD, which is the display element 51, and a heat sink 190 is disposed between the display element 51 and the back side panel 13 for cooling the display element 51. The display element 51 is cooled by this heat sink 190. Additionally, a condenser lens 195 is disposed near the front of the display element 51 as apart of the projection side optical system 220.

The projection side optical system 168 possesses a lens group as apart of the projection side optical system 220 which projects "ON" light that is reflected on the display element 51 to form an optical image on to a screen. The part of the projection side optical system 220 is made into a variable-focus lens with a zooming function that includes a fixed lens group 225 that is incorporated in a fixed barrel and a movable lens group 235 that is incorporated in a movable barrel. The movable lens group 235 is moved by a lens motor 45 for zooming and focusing.

Next, timings at which the first light source 70 and the second light source 120 are turned on and off will be described by reference to a timing chart shown in FIG. 5(*b*). The turning-on of the light sources is controlled by the light source control circuit or device together with the rotational position of the light emitting wheel 101, as shown in the FIG. 5(*a*), with a period of time regarded as one cycle when the light emitting wheel 101 makes one rotation sequentially in the order of the first area 131 where the luminescent material layer made up of the green light emitting luminescent material is formed on the reflection layer, the second area 132 that is made up of the diffusing portion and the third area 133 where the luminescent material layer made up of the green light emitting luminescent material is formed on the dichroic layer.

Namely, as shown in FIG. 5(*b*), with the first area 131 positioned in an optical axis position of light emitted from the first light source 70 and the second light source 120, when the first light source 70 is turned on, light in the green wavelength band is emitted from the green light emitting luminescent material in the luminescent material layer towards the first light source 70 by light in the blue wavelength band emitted from the first light source 70. Light in the blue wavelength band that is not absorbed by the luminescent material and light in the green wavelength band that is generated and emitted towards the transparent base by the luminescent material are reflected on the reflection layer. The light in the blue wavelength band enters the luminescent material layer again to cause light in the green wavelength band to be emitted from the luminescent material. Then, light that is not absorbed by the luminescent material and light in the green wavelength band that is generated and emitted from the luminescent material layer are both emitted from the light emitting wheel 101 towards the first light source 70.

Of the light in the blue wavelength band and the light in the green wavelength band which are emitted from the light emitting wheel 101 towards the first light source 70, the light in the blue wavelength band passes through the first dichroic mirror 143 to return to the first light source 70. The light in the green wavelength band is reflected on the first dichroic mirror 143 and is further reflected on the second dichroic mirror 145 to be emitted from the light source unit 60 towards the light tunnel 175.

In addition, when the second area 132 of the light emitting wheel 101 is positioned in the optical axis position of the light from the light sources with the first light source 70 kept turned on, light in the blue wavelength band from the first light source 70 passes through the diffusing portion, is reflected on the first total reflecting mirror 142 and the second total reflecting mirror 144, passes through the second dichroic mirror 145 and is eventually emitted from the light source unit 60 towards the light tunnel 175.

Then, when the light emitting wheel 101 is rotated until a central point of the second area reaches the optical axis position of light from the first light source 70 and the second light source 120, the first light source 70 is turned off and the second light source 120 is turned on.

Consequently, light in the red wavelength band from the second light source 120 is shone on to the diffusing portion. The light in the red wavelength band then passes through the diffusing portion, is reflected on the first total reflecting mirror 142 and the second total reflecting mirror 144, passes through the second dichroic mirror 145 and eventually is emitted from the light source unit 60 towards the light tunnel 175.

Further, when the light emitting wheel 101 rotates until the third area 133 reaches the optical axis position of light from the second light source 120, not only is the second light source 120 turned on, but also the first light source 70 is turned on.

Consequently, light in the blue wavelength band from the first light source 70 and light in the red wavelength band from the second light source are shown on to the luminescent material layer on the third area 133. The light in the red wavelength band from the second light source 120 is diffused in the luminescent material layer, passes through the luminescent material layer, the dichroic layer and the transparent base and is then emitted from the light source unit 60 towards the light tunnel 175 by the first total reflecting mirror 142 and the second total reflecting mirror 144.

Additionally, the light in the blue wavelength band from the first light source 70 excites the green light emitting luminescent material in the luminescent material layer and is reflected on the dichroic layer to excite further the green light emitting luminescent material. The light in the blue wavelength band that is not absorbed by the green light emitting luminescent material is emitted from the light emitting wheel 101 towards the first light source 70.

Then, light in the green wavelength band that is generated from the green light emitting luminescent material using the light in the blue wavelength band as excitation light is emitted from the light emitting wheel 101 towards the firs dichroic mirror 143 in such a manner as to be emitted from the luminescent material layer directly towards the first light source 70 or to be reflected on the dichroic layer so as to be emitted from the luminescent material layer towards the first light source 70.

Of the light in the blue wavelength band and the light in the green wavelength band which are emitted from the light emitting wheel 101, the light in the blue wavelength band passes through the first dichroic mirror 143, while only the light in the green wavelength band is reflected on the first dichroic mirror 143 and is then emitted from the light source unit 60 towards the light tunnel 175 by the second dichroic mirror 145.

Because of this, the light in the red wavelength band that passes through the second dichroic mirror 145 by way of the first total reflecting mirror 142 and the second total reflecting mirror 144 and the light in the green wavelength band that is reflected on the second dichroic mirror 145 by way of the first dichroic mirror 143 are emitted from the light source unit 60 so as to be incident on the light tunnel 175, thus, the light in the red wavelength band and the light in the green wavelength band being emitted from the light source unit 60 as yellow light.

By controlling the first light source 70 and the second light source 120 so as to be turned on in association with the rotation of the light emitting wheel 101 in the way described above, it is possible to provide the light source unit 60 in which with the single light emitting wheel 101, not only can laser beams in the red wavelength band and the blue wavelength band be emitted as diffuse light which is free from the generation of speckle noise, but also luminescent light in the green wavelength band can be outputted, thereby making it possible to output yellow light which is light of a complementary color. Thus, a bright projection image can be formed.

Additionally, the dichroic layer on the third area 133 of the light emitting wheel 101 of the embodiment shown in FIG. 5 is formed into the dichroic layer that reflects light in the blue wavelength band and light in the green wavelength band. However, there may be a situation in which the dichroic layer on the third area 133 is formed into a dichroic layer that reflects only light in the green wavelength band as required.

Figures 6A, 6B:
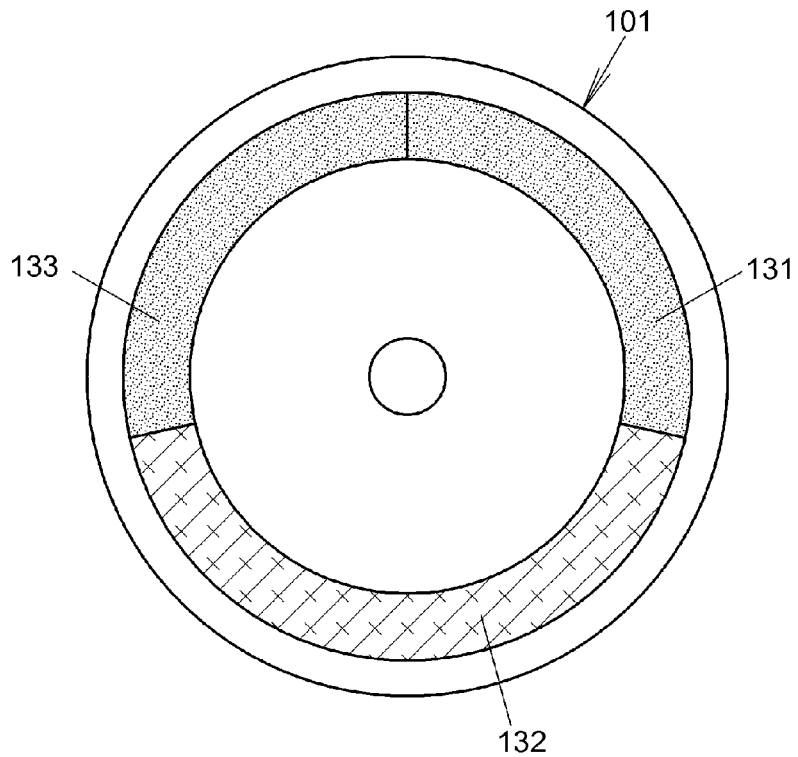
FIG. 6(a) is a diagram showing a light emitting wheel and FIG. 6(b) is a time chart showing light source turning on timings of a light source unit according to another embodiment of the invention.

In alight source unit 60 according to another embodiment of the invention, only the characteristics of a dichroic layer of a light emitting wheel 101 is different from those of the dichroic layer of the light emitting wheel 101 of the embodiment shown in FIG. 5. As shown in FIG. 6(a), the light emitting wheel 101 according to this embodiment possesses a first area 131 where a luminescent material layer including a green light emitting luminescent material is provided on a reflection layer, a second area 132 that is made up of a diffusing portion, and a third area 133 where a luminescent material layer including a green light emitting luminescent material is provided on a dichroic layer.

Then, as shown in FIG. 6(b), when a first light source 70 and a second light source 120 are controlled so as to be turned on using the same turning-on control used in the embodiment shown in FIG. 5, light in the blue wavelength band that is emitted from the first light source 70 is shone on to the first area 131. This causes light in the green wavelength band to be emitted from the light source unit 60. When the light in the blue wavelength band from the first light source 70 is shone on to the second area 132 at a front half portion thereof, the light in the blue wavelength band is emitted from the light source unit 60. When light in the red wavelength band from the second light source 20 is shone on to a rear half portion of the second area 132, the light in the red wavelength band is emitted from the light source unit 60.

Further, when light from the first light source 70 and light from the second light source 120 are shone on to the third area 133, part of the light in the blue wavelength band from the first light source 70 is absorbed by the green light emitting luminescent material in the luminescent material layer to excite the green light emitting luminescent material, while the light in the blue wavelength band that reaches the dichroic layer without being absorbed by the luminescent material passes the dichroic layer and a transparent base while being diffused in the luminescent material layer and is emitted from the light emitting wheel 101 towards a first total reflecting mirror 142 together with the light in the red wavelength band, which is diffused by the luminescent material layer, from the second light source 120 to thereby be emitted towards a light tunnel 175 by way of a second total reflecting mirror 144.

In addition, light in the green wavelength band that is generated from the green light emitting luminescent material is emitted directly towards a first dichroic mirror 143 or is emitted towards the first dichroic mirror 143 after having been reflected on the dichroic layer, thus, the light in the green wavelength band being emitted from the light source unit 60 towards the light tunnel 175 by the first dichroic mirror 143 and a second dichroic mirror 145.

When the light from the first light source 70 and the light from the second light source 120 are shone on to the third area 133, the light in the red wavelength band, the light in the blue wavelength band and the light in the green wavelength band are emitted from the light source unit 60 so as to be incident on the light tunnel 175 as white light, thereby making it possible to form a brighter image.

Figures 7A, 7B:
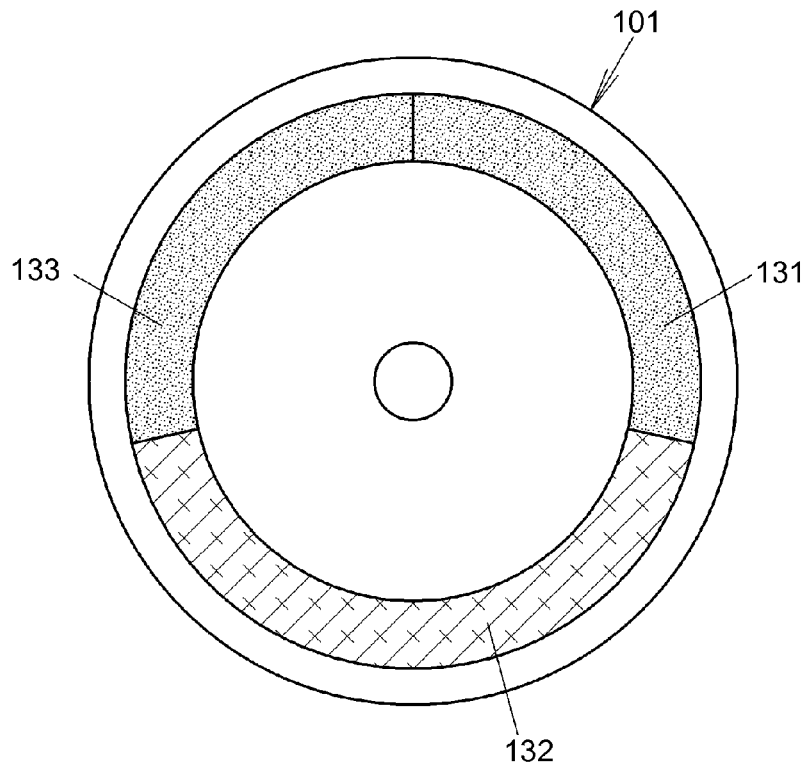
FIG. 7(a) is a diagram showing a light emitting wheel and FIG. 7(b) is a time chart showing light source turning on timings of a light source unit according to a further embodiment of the invention.

Then, in a light source unit 60 according to a further embodiment of the invention in which a dichroic layer of a light emitting wheel 101 is a dichroic layer that reflects light in the green wavelength band, as shown in FIG. 7(b), when light in the blue wavelength band from a first light source 70 is shone on to a first area 131, light in the green wavelength band is emitted from the light source unit 60. When the light in the blue wavelength band from the first light source 70 is shone on to a front half portion of a second area 132, the light in the blue wavelength band is emitted from the light source unit 60. When light in the red wavelength band from the second light source 120 is shone on to a rear half portion of the second area 132, the light in the red wavelength band is emitted from the light source unit 60.

Then, when only light from the first light source 70 is shone on to a third area 133, part of the light in the blue wavelength band is absorbed by a green light emitting luminescent material in a luminescent material layer, and the other part thereof passes through the luminescent material layer while being diffused. The light in the blue wavelength band that passes through the luminescent material layer passes through the dichroic layer and a transparent base, is emitted towards a light tunnel 175 byway of the first total reflecting mirror 142 and the second total reflecting mirror 144. The light in the green wavelength band generated from the green light emitting luminescent material is emitted towards the light tunnel 175 by the first dichroic mirror 143 and the second dichroic mirror 145, whereby light of a greenish-blue (cyan) color can be incident on the light tunnel 175 from the light source unit 60.

Further, there may be a situation in which the dichroic layer on the third area 133 is formed in such a way that a front half portion of the third area 133 is formed into a dichroic layer that reflects light in the blue wavelength band and light in the green wavelength band, while a rear half portion of the third area 133 is formed into a dichroic layer that reflects only light in the green wavelength band.

In a light source unit 60 according to an embodiment of the invention, as shown in FIG. 8, light from a first light source 70 is shone on to a first area 131 and light in the green wavelength band is emitted from the light source unit 60 by the first dichroic mirror 143 and the second dichroic mirror 145. Light in the blue wavelength band from the first light source 70 is shone on to a front half portion of a second area 132 and the light in the blue wavelength band is emitted from the light source unit 60 by the first total reflecting mirror 142 and the second total reflecting mirror 144, while light in the red wavelength band from a second light source 120 is shone on to a rear half portion of the second area 132 and the light in the red wavelength band is emitted from the light source unit 60 by the first total reflecting mirror 142 and the second total reflecting mirror 144. Light from the first light source 70 and light from the second light source 120 are shone on to a third area 133.

Thus, at a front half portion of the third area 133, the light in the red wavelength band that passes through a luminescent material layer and a dichroic layer is emitted from the light source unit 60 by way of the first total reflecting mirror 142 and the second total reflecting mirror 144, and light in the green wavelength band that is generated from the luminescent material layer is emitted from the light source unit 60 by way of the first dichroic mirror 143 and the second dichroic mirror 145 and is allowed to be incident on the light tunnel 175 as yellow light.

Then, at a rear half portion of the third area 133, the light in the red wavelength band and the light in the blue wavelength band that pass through the luminescent material layer and the dichroic layer are emitted from the light source unit 60 byway of the first total reflecting mirror 142 and the second total reflecting mirror 144, and light in the green wavelength band that is generated from the luminescent material layer is emitted from the light source unit 60 by way of the first dichroic mirror 143 and the second dichroic mirror 145 and is allowed to be incident on the light tunnel 175 as white light.

In this way, in the embodiments of the invention, the light emitting wheel 101 as the light emitting plate is provided, and this light emitting plate has the luminescent material area where the luminescent material layer is formed on the front surface thereof and the diffusive transmission area where no luminescent material layer is provided and light incident thereon is transmitted therethrough while being diffused. The luminescent material area is formed to have the portion where the reflection layer is formed on the rear surface of the luminescent material layer through mirror finishing so that all the light from the luminescent material side is reflected and the portion where the dichroic layer is formed on the rear surface of the luminescent material layer so that at least luminescent light is reflected and at least part of the light incident on the front surface of the luminescent material layer is transmitted therethrough.

Thus, the light source unit according to the embodiments has the first light source 70 and the second light source 120 which emit light rays in different wavelength bands, as well as the light emitting plate that includes the luminescent material area and the diffusive transmission area. Therefore, light in at least the three different colors can be formed by the light from the light sources and the light generated through luminescence. Additionally, the light source unit 60 can be made into the light source unit that can emit highly bright light by employing the laser emitting devices for the light sources, and the laser beams from the first light source 70 and the second light source 120 are shone on to the single light emitting plate. Therefore, it is possible to provide the light source unit 60 that functions as the light source unit that is small in size and which can prevent easily the generation of speckle noise.

Additionally, the first light source 70 and the second light source 120 are the light sources that emit light in the blue wavelength band and light in the red wavelength band, respectively, and the luminescent material in the luminescent material layer is the green light emitting luminescent material. Therefore, the resulting light source unit can emit light in the three primary colors, white light and light in complementary colors. Thus, the light source unit and the projector according to the embodiments of the invention can form bright projection images.

In addition, in the light source unit 60 of the embodiments of the invention, the light emitting plate is the circular disk-shaped light emitting wheel 101, and the first area 131, the second area 132 and the third area 133 are disposed end to end in the circumferential direction on the light emitting wheel 101, whereby the light emitting wheel 101 is allowed to be driven to rotate by the drive motor 110. Thus, according to the embodiments, it is possible to provide the light source unit 60 that is small in size and which can easily prevent the generation of noise and the projector 10 that employs the light source unit 60.

Further, by forming the dichroic layer of the third area 133 into the dichroic layer that reflects light in the blue wavelength band and light in the green wavelength band, the light source unit is allowed to emit highly bright light in the green wavelength band. In the event that the dichroic layer of the third area 133 is formed into the dichroic layer that reflects only light in the green wavelength band, light in a different complementary color can be emitted.

It should be noted that the light emitting plate is not limited to the circular disk-shaped light emitting wheel 101. For example, a rectangular plate-shaped light emitting plate may be used in which a first area, a second area and a third area are arranged in a row. In this case, the light emitting plate is shifted by a drive unit such as a piezo-actuator so as to shift sequentially the first area, the second area and the third area in the optical axis positions of light from the first light source 70 and light from the second light source 120.

The embodiments of the invention have been described heretofore. However, these embodiments are presented as the examples, and hence, there is no intention to limit the scope of the invention thereby. The novel embodiments can be carried out in other various forms, and various omissions, replacements and modifications can be made to the invention without departing from the spirit and scope thereof. The resulting embodiments and their modifications are included not only in the spirit and scope of the invention but also in scopes of inventions claimed and their equivalents.

What is claimed is:

1. A light source unit comprising:
a first light source and a second light source that emit light in different wavelength bands;
a luminescent light emitting device including a light emitting plate onto which light emitted from the first light source and the second light source is shone;
a light source control device that controls turning on of the first light source and the second light source and driving of the light emitting plate of the luminescent light emitting device; and
a light guiding optical system that guides the light from the first light source and the second light source that passes through the light emitting plate and luminescent light generated and emitted from the light emitting plate so that optical axes thereof coincide with each other so as to be directed in a same direction,
wherein the light emitting plate comprises a first area where a luminescent material layer is provided on a reflection layer, a second area that transmits the light from the first light source and the second light source while diffusing the light, and a third area where a luminescent material layer is provided on a dichroic layer that reflects the luminescent light and transmits the light from the first light source, and
wherein the luminescent light emitting device comprises a light emitting plate driving device that repeatedly and sequentially positions the first area, the second area and the third area in an optical axis position of the light emitted from the first light source and the second light source.

2. A light source unit as set forth in claim 1, wherein:
the first light source and the second light source are a light source that emits light in a blue wavelength band and a light source that emits light in a red wavelength band, respectively, and
a luminescent material in the luminescent material layer is a luminescent material that emits light in a green wavelength band and the dichroic layer reflects at least light in the green wavelength band.

3. A light source unit as set forth in claim 1, wherein:
the light emitting plate has a circular disk shape,
the first area, the second area and the third area are disposed in a circumferential direction, and
the light emitting plate driving device is a drive motor that rotates the light emitting plate.

4. A light source unit as set forth in claim 2, wherein:
the light emitting plate has a circular disk shape,
the first area, the second area and the third area are disposed in a circumferential direction, and
the light emitting plate driving device is a drive motor that rotates the light emitting plate.

5. A light source unit as set forth in claim 1, wherein:
the dichroic layer has a dichroic layer area that reflects light in a green wavelength band, and a dichroic layer area that reflects light in the green wavelength band and light in a blue wavelength band.

6. A light source unit as set forth in claim 2, wherein
the dichroic layer has a dichroic layer area that reflects light in the green wavelength band, and a dichroic layer area that reflects light in the green wavelength band and light in the blue wavelength band.

7. A light source unit as set forth in claim 3, wherein
the dichroic layer has a dichroic layer area that reflects light in a green wavelength band, and a dichroic layer area that reflects light in the green wavelength band and light in a blue wavelength band.

8. A light source unit as set forth in claim 4, wherein
the dichroic layer has a dichroic layer area that reflects light in the green wavelength band, and a dichroic layer area that reflects light in the green wavelength band and light in the blue wavelength band.

9. A light source unit as set forth in claim 1, wherein:
the first light source and the second light source are laser emitting devices.

10. A projector comprising:
the source unit set forth in claim 1;
a display element that forms an optical image by light shone thereonto;
a light source side optical system that guides light from the light source unit to the display element;
a projection side optical system that projects the optical image that is formed by the display element onto a screen; and
a projector control system having a light source control unit for the light source unit and a display element control unit.

* * * * *

UNITED STATES PATENT AND TRADEMARK OFFICE
CERTIFICATE OF CORRECTION

PATENT NO. : 8,957,366 B2  
APPLICATION NO. : 13/644206  
DATED : February 17, 2015  
INVENTOR(S) : Takeshi Miyazaki Page 1 of 1

It is certified that error appears in the above-identified patent and that said Letters Patent is hereby corrected as shown below:

In the Claims

Column 16, Claim 10, Line 2, before "source" insert --light--.

Signed and Sealed this
Fourteenth Day of July, 2015

Michelle K. Lee
*Director of the United States Patent and Trademark Office*